United States Patent
Yamaguchi et al.

(10) Patent No.: US 12,530,712 B2
(45) Date of Patent: Jan. 20, 2026

(54) INFORMATION PROCESSING APPARATUS FOR RECOMMENDING A DESIRED VEHICLE TOPCOAT WHEN THE BODY COLOR DOES NOT MATCH

(71) Applicant: TOYOTA JIDOSHA KABUSHIKI KAISHA, Toyota (JP)

(72) Inventors: Kenji Yamaguchi, Miyoshi (JP); Yohei Nakanishi, Nagoya (JP); Yu Hamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 18/495,268

(22) Filed: Oct. 26, 2023

(65) Prior Publication Data

US 2024/0144348 A1    May 2, 2024

(30) Foreign Application Priority Data

Oct. 31, 2022    (JP) .................................. 2022-174526

(51) Int. Cl.
   *G06Q 30/0601*    (2023.01)
   *G06Q 30/0201*    (2023.01)
(52) U.S. Cl.
   CPC ..... *G06Q 30/0631* (2013.01); *G06Q 30/0206* (2013.01)
(58) Field of Classification Search
   CPC ........................ G06Q 30/0631; G06Q 30/0206
   See application file for complete search history.

(56) References Cited

U.S. PATENT DOCUMENTS

| | | |
|---|---|---|
| 2012/0234471 A1 | 9/2012 | Guenard |
| 2013/0041858 A1 | 2/2013 | Fujieda et al. |
| 2016/0117743 A1 | 4/2016 | Joshi |
| 2021/0016553 A1 | 1/2021 | Brei et al. |
| 2021/0279510 A1 | 9/2021 | Kouzaki et al. |
| 2022/0089884 A1 | 3/2022 | Fujioka et al. |
| 2022/0105541 A1 | 4/2022 | Naganuma et al. |
| 2022/0138699 A1 | 5/2022 | Graham et al. |
| 2022/0161287 A1 | 5/2022 | Naganuma et al. |

(Continued)

FOREIGN PATENT DOCUMENTS

| | | |
|---|---|---|
| JP | 2003-316881 A | 11/2003 |
| JP | 2007-94667 A | 4/2007 |

(Continued)

OTHER PUBLICATIONS

Non-Final Office Action issued Jun. 2, 2025 in U.S. Appl. No. 18/504,346.

(Continued)

*Primary Examiner* — Ming Shui
(74) *Attorney, Agent, or Firm* — Sughrue Mion, PLLC

(57) ABSTRACT

The information processing apparatus acquires the first body color desired by a user as a body color of a vehicle ordered by the user. Furthermore, based on at least the appraised value of the vehicle having a first body color after a predetermined period has elapsed, the information processing apparatus determines whether or not to propose to the user to topcoat the vehicle having the second body color with an easily peelable paint of the first body color.

5 Claims, 9 Drawing Sheets

(56) References Cited

U.S. PATENT DOCUMENTS

| | | | |
|---|---|---|---|
| 2023/0162243 A1* | 5/2023 | Southin | G06Q 30/06 705/306 |
| 2024/0144740 A1 | 5/2024 | Yamaguchi et al. | |
| 2024/0161170 A1 | 5/2024 | Yamaguchi et al. | |
| 2024/0257191 A1* | 8/2024 | Lynch | G01J 3/027 |

FOREIGN PATENT DOCUMENTS

| | | | |
|---|---|---|---|
| JP | 2009-25155 A | 2/2009 | |
| JP | 2022-59901 A | 4/2022 | |
| JP | 2022-83522 A | 6/2022 | |
| WO | WO-0171458 A2 * | 9/2001 | G06Q 30/06 |

OTHER PUBLICATIONS

Communication dated Oct. 10, 2025 from the U.S. Appl. No. 18/487,633.

* cited by examiner

SPECIFICATION DATA

| ORDER ID | USER ID | VEHICLE MODEL ID | GRADE | FIRST BODY COLOR | SECOND BODY COLOR | OPTION | ... |
|---|---|---|---|---|---|---|---|
| ... | U001 | V001 | X | C001 | C011 | ... | ... |
| ... | U002 | V002 | X | C001 | C012 | ... | ... |
| ... | U003 | V003 | G | C002 | C013 | ... | ... |
| ... | ... | ... | ... | ... | ... | ... | ... |

Fig. 3A

APPRAISED VALUE DATA

| VEHICLE MODEL ID | GRADE | BODY COLOR | VALUATION MONTHS | APPRAISED VALUE |
|---|---|---|---|---|
| V001 | ... | C001 | JAN. 2024 – Mar. 2024 | ¥1,500,000 |
| V001 | ... | C001 | ... | ... |
| V001 | ... | C001 | ... | ... |
| V001 | ... | C002 | ... | ... |
| V001 | ... | C002 | ... | ... |
| V001 | ... | C003 | ... | ... |
| V001 | ... | C003 | ... | ... |
| V001 | ... | C024 | ... | ... |

Fig. 3B

ORDER-RELATED DATA

| VEHICLE MODEL ID | GRADE | BODY COLOR | DELIVERY A | DELIVERY B | VEHICLE BASE |
|---|---|---|---|---|---|
| V001 | ... | C001 | IMMEDIATE | 2 WEEKS | A FACTORY |
| V002 | ... | C002 | 8 WEEKS | 10 WEEKS | B FACTORY |
| ... | ... | ... | ... | ... | ... |

Fig. 3C

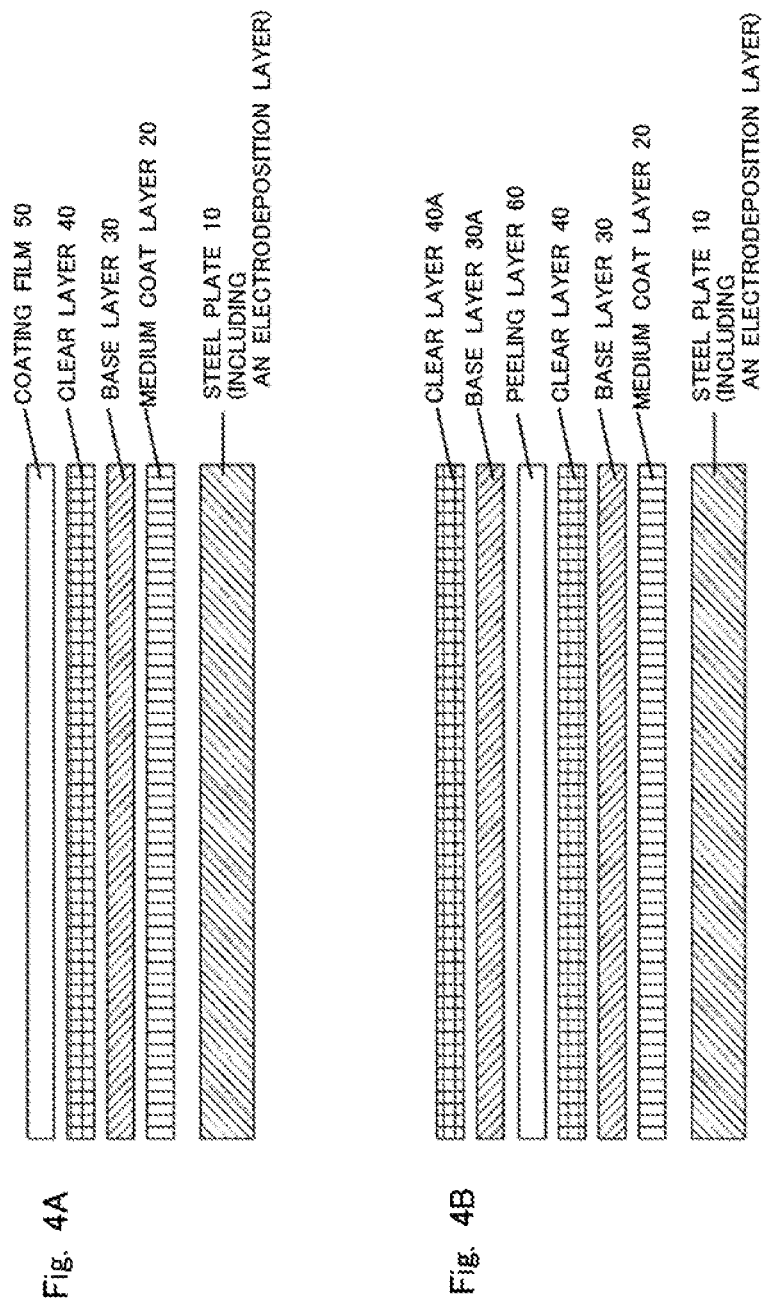

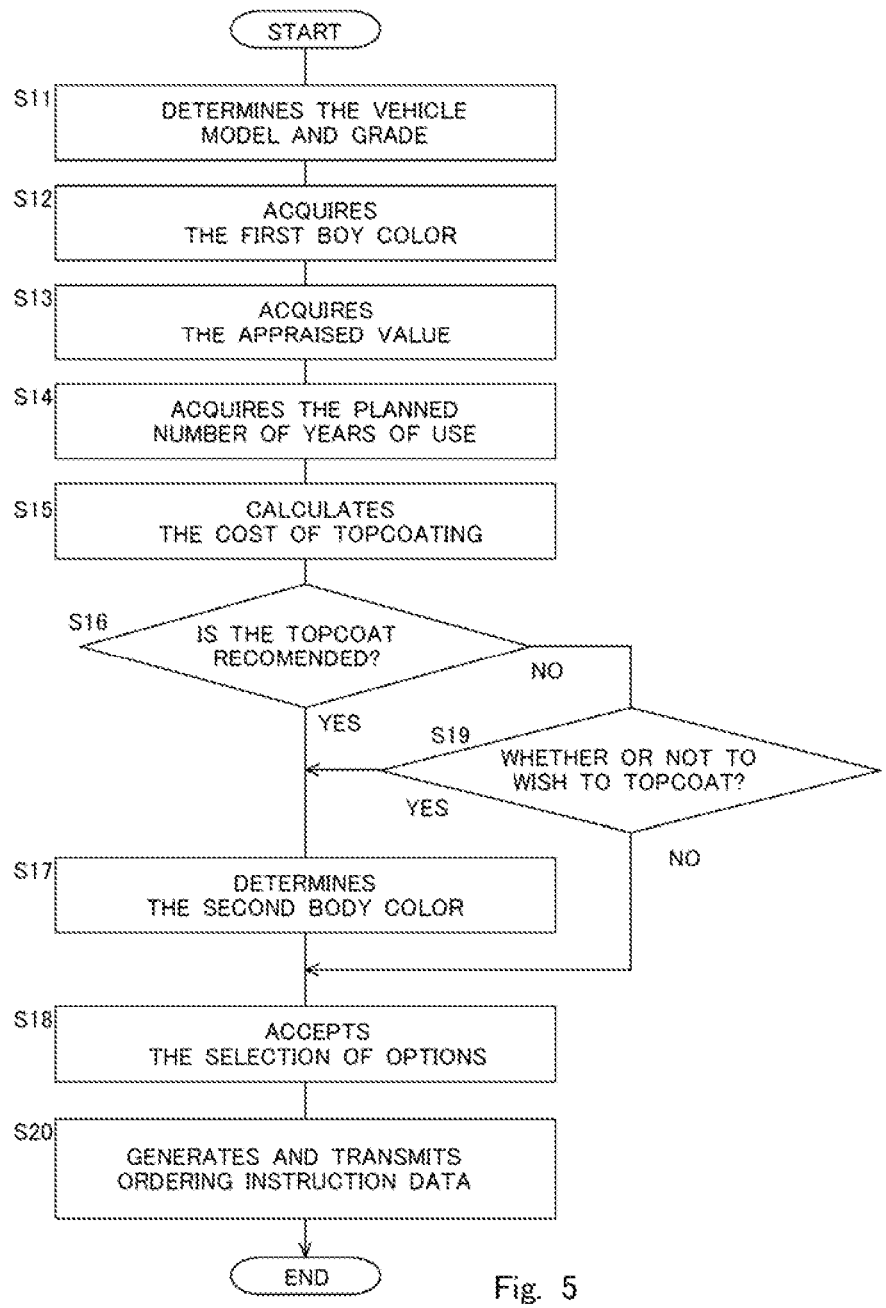

EXPECTED APPRAISED VALUE
WHEN THE TOPCOAT IS REMOVED FROM THE VEHICLE
AFTER 3 YEARS

MODEL OF THE VEHICLE XXXX

| OLIGINAL COLOR | EXPECTED APPRAISED VALUE |
|---|---|
| PEARL WHITE | ¥1,620,000 |
| SILVER METALLIC | ¥1,550,000 |
| SENSUAL RED | ¥1,480,000 |
| DARK BLUE | ¥1,510,000 |
| GRAY METALLIC | ¥1,560,000 |
| BLACK MICA | ¥1,590,000 |

NEXT

Fig. 7

INFORMATION PROCESSING APPARATUS FOR RECOMMENDING A DESIRED VEHICLE TOPCOAT WHEN THE BODY COLOR DOES NOT MATCH

CROSS REFERENCE TO THE RELATED APPLICATION

This application claims the benefit of Japanese Patent Application No. 2022-174526, filed on Oct. 31, 2022, which is hereby incorporated by reference herein in its entirety.

BACKGROUND

Technical Field

The present disclosure relates to an information processing apparatus.

Description of the Related Art

A technique for changing the color of the vehicle body by topcoating the body of a car with a peelable paint film is known (see, for example, Patent Literature 1).

CITATION LIST

Patent Literature

Patent Literature 1: Japanese Patent Laid-Open No. 2022-059901

SUMMARY

The purpose of present disclosure is to improve the value of a vehicle at the time of resale.

The first aspect of the present disclosure may be an information processing apparatus having a controller configured to execute: acquiring the first body color desired by a user as a body color of a vehicle ordered by the user, and at least based on the appraised value of the vehicle having a first body color after a predetermined period has elapsed, determining whether or not to propose to the user to topcoat the vehicle having the second body color with an easily peelable paint of the first body color.

Another aspect of the present disclosure is a method executed by the information processing apparatus, a program for causing the method to be executed by a computer, or a computer-readable storage medium in which the program is stored non-temporarily.

According to the present disclosure, the value at the time of resale of the vehicle can be improved.

BRIEF DESCRIPTION OF THE DRAWINGS

FIGS. 3A-3C are examples of specification data, appraised value data, and order-related data.

FIGS. 4A and 4B are overview diagrams of coating with an easily peelable paint.

FIG. 5 is a flowchart of the process executed by the contract server.

FIG. 7 is an example of a screen for guiding the appraised value for each second body color.

DESCRIPTION OF THE EMBODIMENTS

Figure 1:
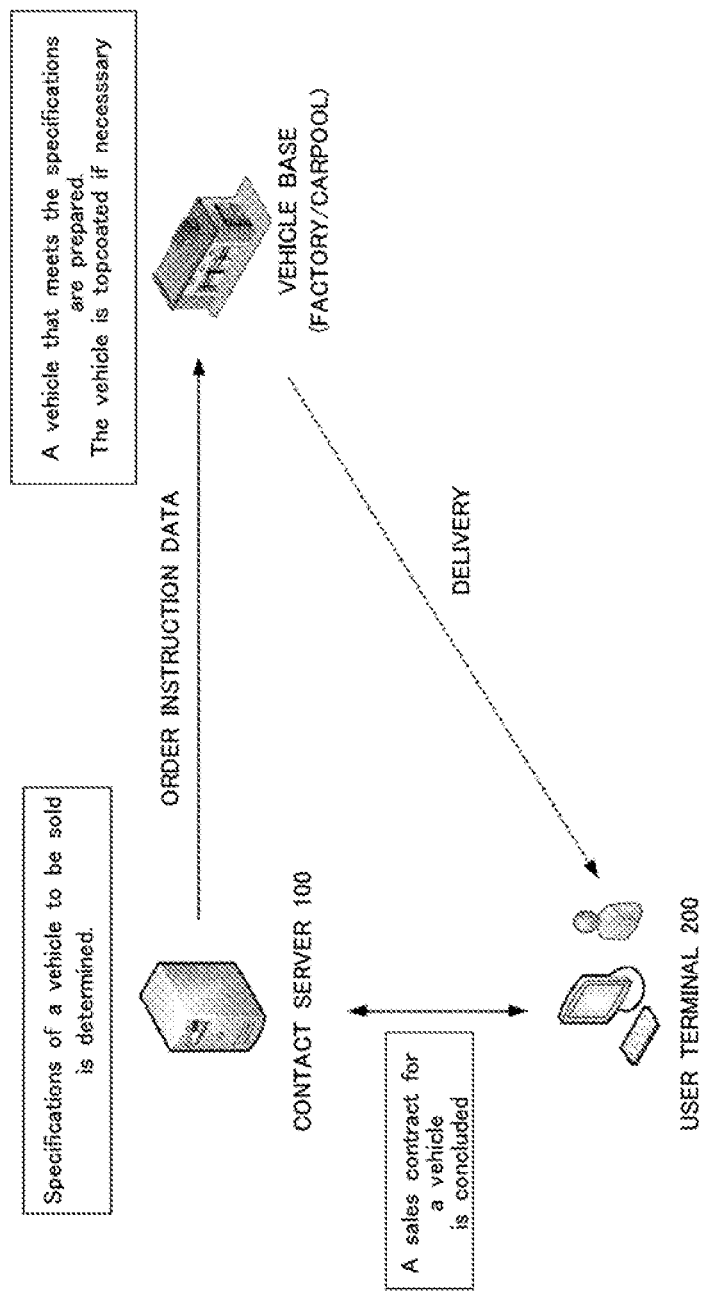
FIG. 1 is a diagram illustrating an outline of a vehicle ordering system.

It is known that the appraised value when selling a vehicle as a used car varies depending on the body color of the vehicle. For example, a vehicle with a popular color in the used car market can have a higher appraised value than a vehicle with a color that is not.

The body color desired by the user who purchases the vehicle is not necessarily the color that is highly evaluated in the used car market. That is, depending on the body color desired by the user, there will be a difference in value at the time of sale. The information processing apparatus according to the present disclosure solves such problems.

The information processing apparatus according to the first aspect of the present disclosure may be an information processing apparatus having a controller configured to execute: acquiring the first body color desired by a user as a body color of a vehicle ordered by the user, and at least based on the appraised value of the vehicle having a first body color after a predetermined period has elapsed, determining whether or not to propose to the user to topcoat the vehicle having the second body color with an easily peelable paint of the first body color.

An easily peelable paint is a paint that forms a coating film that can be peeled off. The easily peelable paint may be one in which the paint layer itself can be peeled off. Further, the easily peelable paint may consist of a layer capable of peeling off and a layer of paint formed on the layer. The body color of the vehicle can be changed by coating the vehicle with an easily peelable paint and peeling off the coat after the fact.

When the user orders a vehicle, in addition to the method of ordering a vehicle having a specified body color, the user can select a method of topcoating a vehicle having a body color having high resale value with an easily peelable paint. Thereby, it is possible to balance the problem of maintaining a high value when reselling a used car and the task of providing a vehicle having a body color desired by the user.

However, the user cannot know in advance which method will ultimately benefit the user.

Therefore, the information processing apparatus according to the present disclosure decides whether or not to propose to the user a topcoat with an easily peelable paint based at least on the appraised value of the vehicle having the first body color after a predetermined period has elapsed. For example, after a predetermined period has elapsed, if there is a second body color with an appraised value higher than the first body color desired by the user, the controller can propose to the user to topcoat the vehicle having the second body color with an easily peelable paint of the first body color.

The appraised value of the vehicle after a predetermined period has elapsed may be calculated each time or may be acquired using a database or a machine learning model.

According to such a form, it becomes possible to provide a vehicle having a body color desired by the user while ensuring the resale value of the vehicle.

The controller may further calculate the cost of topcoating the vehicle with an easily peelable paint. The cost can be calculated, for example, based on the model of the vehicle specified by the user and the first body color desired by the user.

Even if it is expensive to topcoat the vehicle, if the improvement in the appraised value by using the second body color as the base color exceeds the cost, there may be a financial advantage to topcoat the vehicle with an easily peelable paint. Therefore, the controller may calculate (A) the appraised value of the vehicle having the second vehicle body color after a predetermined period has elapsed, (B) the appraised value of the vehicle having the first vehicle body color after the predetermined period has elapsed, and (C) the cost of topcoating. Then, based on (A)–(C), the controller may decide whether or not to propose to the user a topcoat of the vehicle with an easily peelable paint. For example, when the relationship between A>B+C is established, the controller may propose to the user a topcoat of the vehicle with an easily peelable paint.

The appraised value of the vehicle may decrease as the period from the time of manufacture of the new vehicle has passed. Therefore, after further determining the predetermined period, the corresponding appraised value may be obtained. For example, the user may be asked whether or not the vehicle is planned to be sold in the future, and if there is a plan to sell, the appraised value may be obtained based on the scheduled date. If the target vehicle is a leased vehicle, the predetermined period may be the lease contract period of the vehicle.

Further, the controller acquires the appraised value of the vehicle after a predetermined period has elapsed for each of the plurality of candidates for the second body color, and the acquired appraised value may be presented to the user together with the candidate for the second body color.

According to such a configuration, the body color having a higher appraised value can be proposed.

Specific embodiments of the present disclosure will be described below on the basis of the drawings. The hardware configuration, module configuration, functional configuration, etc. described in each embodiment are not intended to limit the technical scope of disclosure to them unless otherwise specified.

First Embodiment

An outline of the vehicle ordering system according to the first embodiment will be described with reference to FIG. The vehicle ordering system according to the present embodiment includes a contract server 100 and a user terminal 200.

The contract server 100 is a server device that concludes a sales contract for a vehicle with a user. The contract server 100 determines the specifications of the vehicle to be sold to the user by interacting with the user terminal 200 and concludes a sales contract.

The user terminal 200 is a computer used by a user who purchases a vehicle. The user can access the contract server 100 via the user terminal 200 and apply for a vehicle sales contract. Here, it is assumed that the sales contract is performed online, but the sales contract may be performed at a store (for example, a car dealer). In this case, the user terminal 200 may be a computer installed in a store.

Figure 2:
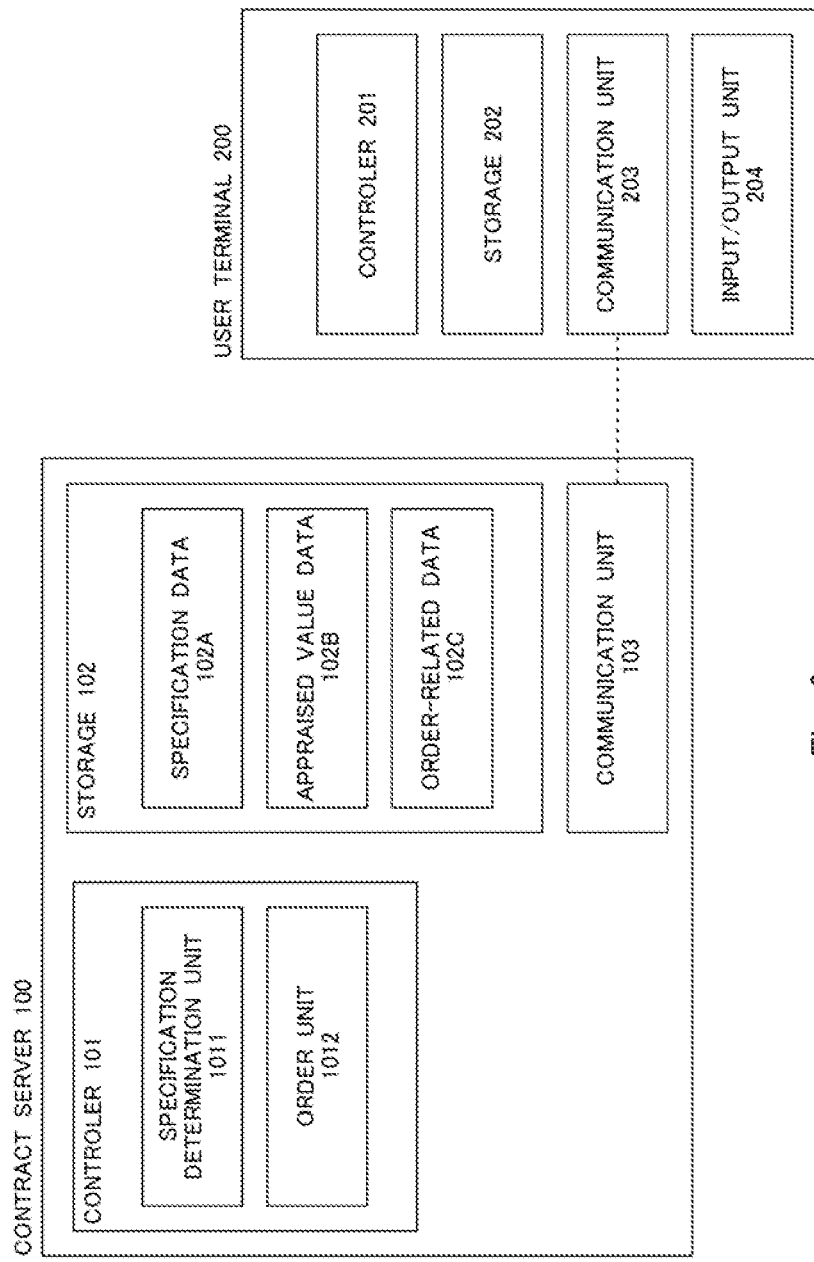
FIG. 2 is a diagram for explaining the configuration of a contract server and a user terminal.

FIG. 2 is a diagram showing in more detail the components of the contract server 100 and the user terminal 200 included in the vehicle ordering system according to the present embodiment. Here, first, the user terminal 200 will be described.

The user terminal 200 is a computer used by an individual, such as, for example, a personal computer, a smartphone, a mobile phone, a tablet computer, and a personal information terminal. The user terminal 200 includes a controller 201, a storage 202, a communication unit 203, and an input/output unit 204.

The controller 201 is an arithmetic unit that controls the control performed by the user terminal 200. The controller 201 can be realized by an arithmetic processing unit such as a CPU (Central Processing Unit).

The controller 201 executes a function of accessing the contract server 100 and performing interaction. The function may be implemented by a web browser operating on the user terminal 200 or dedicated application software.

The storage 202 includes a main memory and an auxiliary storage device. The main memory is a memory in which a program executed by the controller unit 201 and data used by the control program are deployed. The auxiliary storage device is a device that stores a program executed in the controller 201 and data used by the control program. The auxiliary storage device may store a program executed by the controller 201 packaged as an application. It may also store the operating system for running these applications. The program stored in the auxiliary storage device is loaded into the main memory and executed by the controller 201, and the process described herein is performed.

The main memory may include RAM (Random Access Memory) or ROM (Read Only Memory). The auxiliary storage device may include an EPROM (Erasable Programmable ROM) or a hard disk drive (HDD, Hard Disk Drive). Further, the auxiliary storage device may include removable media, ie portable recording media.

The communication unit 203 is a wireless communication interface for connecting the user terminal 200 to the network. The communication unit 203 is configured to be able to communicate with the contract server 100 via a mobile communication service such as wireless LAN or 3G, 4G, or 5G, for example.

The input/output unit 204 is a unit that accepts input operations performed by the user and presents information to the user. In the present embodiment, it consists of one touch panel display. That is, it is composed of a liquid crystal display and its control means, a touch panel and its control means.

Next, the contract server 100 will be described. The contract server 100 is a server device that concludes a vehicle sales contract based on the result of an interaction with the user terminal 200.

In the present embodiment, the contract server 100 may be configured to run a web server for interaction with the user terminal 200. In this case, for example, the user terminal 200 can perform a contract conclusion procedure by accessing the Web service using a browser. The contract server 100 may provide services by means other than the Web server. For example, a service that interacts with dedicated application software installed on the user terminal 200 using a predetermined protocol may be executed on the contract server 100.

The contract server 100 can be configured as a computer having a processor such as a CPU or GPU, a main memory such as RAM or ROM, and an auxiliary storage device such as an EPROM, a hard disk drive, or removable media. The auxiliary storage device stores the operating system (OS), various programs, various tables, etc. By loading and executing the program stored in the auxiliary storage device into the work area of the main memory, and controlling each component unit and the like through the execution of the program, each function corresponding to a predetermined purpose as described later can be realized. However, some or all functions may be realized by hardware circuits such as ASICs and FPGAs.

The contract server 100 is configured by having a controller 101, a storage 102, and a communication unit 103.

The controller 101 is an arithmetic unit that controls the control performed by the contract server 100. The controller 101 can be realized by an arithmetic processing unit such as a CPU. The controller 101 is configured to have two functional modules, a specification determination unit 1011 and an order unit 1012. Each functional module may be realized by executing the stored program by the CPU.

The specification determination unit 1011 determines the specifications of the vehicle related to the purchase and sale by interacting with the user terminal 200. The specification determination unit 1011 determines the following matters as the specifications of the vehicle. In the following description, a vehicle sold to a user is simply referred to as a "vehicle". Sales include sales on the assumption that the vehicle will be returned or sold after a specified period of time, such as sales with residual value credit and lease sales.

(i) Vehicle Type and Vehicle Grade
(ii) Body Color
(iii) Others (options, etc.)

Here, the body color is the color of the vehicle body desired by the user. The body color does not necessarily have to be a single color. The body color may be two-tone or with an accent color. In the following description, the color of the vehicle body desired by the user is referred to as the first body color.

As described above, the method of providing a vehicle having the vehicle body color (first body color) desired by the user includes a method of "ordering a vehicle having a first body color" and "ordering a vehicle having a body color other than the color desired by the user (second body color) and then topcoating the first body color".

If the first body color is a body color with a lower resale value than the second body color, the latter method may be a financial advantage for the user.

Therefore, the contract server 100 according to the present embodiment decides which method to propose to the user based on the expected valuation value for each vehicle body color after a predetermined period of time has elapsed of the vehicle according to the sales contract.

When a vehicle using an easily peelable paint is ordered, the user of the vehicle can use the vehicle having the desired body color during a predetermined period, and after the predetermined period has elapsed, the easily peelable paint can be peeled off to return to a body color with high resale value. For example, when purchasing a vehicle using residual value setting credit, such a method is effective because the remaining bond is repaid by selling the vehicle after a predetermined number of years has elapsed.

In addition, if there is no plan to sell the vehicle after a predetermined number of years have elapsed (for example, when the user continues to own the vehicle), it may be better not to use an easily peelable paint.

The order unit 1012 generates data (order instruction data) for instructing the ordering of a vehicle based on the specifications determined by the specification determination unit 1011 and transmits it to an appropriate vehicle base. If the vehicle is a stock vehicle, the vehicle base can be a carpool to which the vehicle belongs. Further, if the vehicle is made to order, the vehicle base can be a vehicle manufacturing factory. Further, when both the first body color and the second body color are specified, the order unit 1012 includes a vehicle coating instruction using an easily peelable paint in the order instruction data.

For example, when red is specified as the first body color and white is specified as the second body color, the order unit 1012 includes an instruction to the effect that "a vehicle having a white body color is topcoated with red and shipped" in the order instruction data.

The storage 102 includes a main memory and an auxiliary storage device. The main memory is a memory in which a program executed by the controller unit 101 and data used by the control program are deployed. The auxiliary storage device is a device that stores a program executed in the controller 101 and data used by the control program.

The storage 102 stores specification data 102A, appraised value data 102B, and order-related data 102C.

The specification data 102A is data that records the specifications of the vehicle to be ordered, and is generated by the order unit 1012.

FIG. 3A is an example of specification data 102A. As shown, the specification data 102A includes a unique identifier for each vehicle order, a user identifier, a vehicle model identifier, a grade identifier, a first body color identifier, a second body color identifier, and other information related to specifications (eg, options).

The appraised value data 102B is data related to the appraised value of the vehicle for each body color. In the following description, the appraised value shall represent the appraised value when the target vehicle is sold as a used car after a predetermined period has elapsed.

The appraised value of a vehicle when selling it as a used car can vary depending on the model and age. Furthermore, even if it is the same model and age, the appraised value can vary depending on the color of the vehicle body.

Therefore, the contract server 100 refers to the appraised value data 102B, and after a predetermined period has elapsed, based at least on the expected appraised value for each body color, the vehicle to be ordered It is determined whether or not to apply a topcoat with an easily peelable paint. For example, when a topcoat with an easily peelable paint is applied, the expected appraised value of the vehicle after a predetermined period of time is the expected appraised value of the vehicle on which the easily peelable paint has been peeled off.

FIG. 3B indicates an example of the appraised value data 102B. The appraised value data 102B is data that describes the expected appraised value of the vehicle after a predetermined period has elapsed for each body color. The appraised value data includes vehicle type and grade identifiers, body color identifiers, valuation months, and appraised values, as shown. The appraised value may be a value guaranteed in advance by the operator. The appraised value may be set based on transaction performance in the used car market. In the illustrated example, if a vehicle with a vehicle type: V001 and body color: C001 is sold between January and March 2024, the appraised value will be 1.5 million yen.

The appraised value data 102B is updated appropriately according to the market price of the used car market.

Further, the storage 202 stores the order-related data 102C. Order-related data 102C is data related to ordering a vehicle. An example of order-related data 102C is shown in FIG. 3C. As shown, the order-related data 102C includes a vehicle model identifier, a grade identifier, a body color (original body color) identifier, status, delivery date, ordering vehicle base identifier, and the like. The delivery date A in the figure is the delivery date when the topcoating with the easily peelable paint is not performed, and the delivery date B is the delivery date when the topcoating is performed with the easily peelable paint. The order-related data 102C is appropriately updated according to the production status of the vehicle.

Each of the aforementioned data may be constructed by a database management system (DBMS) program executed by a processor to manage the data stored in the storage device. In this case, each data can be, for example, a relational database.

The communication unit 103 is a communication interface for connecting the contract server 100 to the network. The communication unit 103 includes, for example, a network interface board and a wireless communication interface for wireless communication.

The configuration shown in FIG. 2 is an example, and all or part of the illustrated function may be executed using a circuit specially designed. Further, the program may be stored or executed by a combination of a main memory and an auxiliary storage device other than those shown.

Here, an easily peelable paint will be described. FIG. 4A is a schematic cross-sectional view indicating a body member (for example, a steel plate) having a vehicle body and a coating film formed on the body member. As shown, the body member includes a steel plate 10, a medium coat layer 20, a base layer 30, and a clear layer 40. original is formed on the steel plate 10 by metal processing. The medium coat layer 20, the base layer 30, and the clear layer 40 are formed in order on the electrodeposition layer.

The base layer 30 is a base layer for coating. The base layer 30 may be a pearl layer, a mica layer, or a glass flake layer.

In this example, an example in which the base layer 30 is one layer is shown, but the base layer 30 may have two or more coating film. When the base layer 30 is two layers, the coating film layer is four layers together with the medium coat layer 20 and the clear layer 40.

Further, the base layer 30 and the clear layer 40 may be provided again on the clear layer 40.

A coating film 50 is formed on the outer surface of the body member. The coating film 50 is a layer of paint formed by coating an easily peelable paint, and has the property that it can be easily peeled off by applying force compared to a normal coating film. The coating film 50 is formed by, for example, coating an easily peelable paint on a body member by a spray method. Examples of the easily peelable paint include a paint made of xylene, ethylbenzene, antioxidant, methyl ethyl ketone, silica reactant, titanium oxide (nanoparticles), and an organic solvent.

In addition, when it is necessary to have weather resistance, scratch resistance, and chipping properties in the coating of the vehicle, a coating film 50 having each function can be applied.

The topcoat of the vehicle with the easily peelable paint can be performed at a predetermined base before the vehicle is shipped. Thereby, the body color of the vehicle can be easily changed (that is, changed from the first body color to the second body color). The same applies to the peeling of the coating film 50. By peeling off the coating film 50 at a predetermined base, the vehicle body color can be returned to the original one (that is, it can be returned from the second body color to the first body color). Since the original paint is protected by the paint film 50, it is possible to obtain a used vehicle whose body paint has not deteriorated.

Note that coating with the coating film 50 does not need to be performed on all body members. For example, it is not necessary to provide the coating film 50 for portions that are not exposed to the outside during driving, such as the inside of an opening such as a door.

In this example, a steel plate has been exemplified as a body member, but the body member may be a resin member. In this case, the medium coat layer 20 becomes a primer layer. Further, a clear layer may be provided on the coating film 50.

In the example of FIG. 4A, the paint itself has been given easy peelability, but normal coating may be applied on a layer having easy peelability. For example, as shown in FIG. 4B, a peeling layer 60 may be formed by the same material as the coating film 50, and the base layer 30A and the clear layer 40A may be formed on the peeling layer 60. The base layer 30A is a layer of paint having a different color from the base layer 30. Even in such a form, the paint layer can be removed by peeling off the peeling layer 60.

In this example, one color is illustrated as the first body color and the second body color, but the first body color and the second body color may be composed of a plurality of colors. For example, a plurality of colors arranged in a predetermined pattern may be a first body color or a second body color.

Further, the topcoating according to the second body color may be performed on at least a part of the coating according to the first body color. That is, the topcoat by the second body color may not cover all of the coating according to the first body color. For example, if the first body color is black, a vehicle with a two-tone black and blue color can be obtained by applying a blue topcoat to part of it.

Return to the description of the contract server 100. FIG. 5 is a flowchart showing a process executed by the contract server 100. The process shown in FIG. 5 is started, for example, when a user logs in to the contract server 100. At the timing of starting the process, the contract server 100 assumes that the identification of the user has been completed.

The processing of steps S11-S19 is executed by the specification determination unit 1011.

In step S11, the vehicle model and grade are determined. In this step, the user selects the desired vehicle model and grade from a plurality of preset vehicle models and grade combinations. In step S12, the body color (first body color) desired by the user is acquired. The first body color may be selected from a predetermined color lineup. In step S13, the appraised value data 102B stored in the storage 102 is acquired.

In step S14, the planned number of years of use of the vehicle is acquired. For example, when a user uses a residual value setting credit contract, the contract years may be the number of years the vehicle is scheduled to be used.

Here, although an example of determining the planned number of years of use is determined depending on whether or not a residual value setting type credit contract is used, the planned number of years of use of the vehicle may be determined using other information. For example, as a mode of sale, the user may be allowed to select a one-time purchase or lease. Then, when the sales form is a lease, the contract years may be acquired as the planned number of years of use of the vehicle. Further, if the sales mode is a one-time purchase, the user may be asked whether there is a plan to sell the vehicle in the future.

Next, in step S15, the cost of topcoating the vehicle according to the first body color is calculated. The cost of topcoat with easily peelable paint may vary depending on the model, size, and body color of the vehicle. In this step, the fee may be calculated by referring to the fee table stored in advance. The cost of topcoat with an easily peelable paint is hereinafter referred to as the coating cost.

In step S16, it determined whether or not a topcoat with an easily peelable paint is recommended. In this step, it determined whether or not there is a body color (second body color) with a higher appraised value after the predetermined period has elapsed than the amount obtained by adding the coating cost to the appraised value of the vehicle having the first body color after the predetermined period has elapsed. For example, after a predetermined period has elapsed, the appraised value of the vehicle having the first body color is X1, and the coating cost of the first body color is X2. In this case, if there is a body color whose appraised value after the predetermined period has elapsed exceeds X1+X2, it is more beneficial for the user to topcoat the vehicle having the body color with the first body color. In this step, it is determined that a topcoat with an easily peelable paint is recommended in such a case.

When a topcoat with an easily peelable paint is recommended, the process proceeds to step S17. In step S17, the base color (second body color) of the target vehicle is determined based on the appraised value for each vehicle body color. The second body color can be determined based on predetermined criteria. For example, the following can be adopted as predetermined standards.
 (i) Among the plurality of body colors, the body color with the highest appraised value is determined as the second body color.
 (ii) Determine one of the body colors whose appraised value is higher than the predetermined value as the second body color.

What criteria to use is determined by the will of the person selling the vehicle in the future (e.g., the leasing company that owns the vehicle).

The predetermined value can be a value based on the new vehicle price of the relevant vehicle model. For example, the second body color can be a color whose appraised value after three years is higher than 65% of the new car price.

In general, the body color with a high appraised value is determined by its popularity in the used car market. For example, body colors that include pearl layers and pearl mica layers are more popular than other body colors and tend to have higher appraised values. Therefore, the color that can be selected as the second body color is more limited than the color that can be selected as the first body color. The second body color may be any color as long as the appraised value is higher than the first body color.

Figure 6:
FIG. 6 is an example of a screen for specifying a second body color.

The second body color is preferably selected by the user. In this step, the contract server 100 generates a user interface screen that proposes to the user to topcoat the vehicle having the second body color with an easily peelable paint having the first body color, and outputs it to the user terminal 200. Further, for example, a user interface screen for presenting the appraised value of the vehicle after a predetermined period of time is elapsed for each body color may be output, and the user may be allowed to select the desired color. FIG. 6 is an example of a user interface screen (GUI) in which a topcoat with an easily peelable paint is proposed to the user and a second body color is selected.

On the screen, the advantages and disadvantages of topcoating may be explained to the user.

Further, on the screen, the expected appraised value of the vehicle after a predetermined period has elapsed may be presented for each vehicle body color. FIG. 7 is an example of a user interface screen that guides the expected valuation appraised value of the vehicle after a predetermined period (for example, 3 years) has elapsed. Similarly, the screen indicated in FIG. 7 is generated by the contract server 100 and output to the user terminal 200. The expected appraised value can be acquired based on the appraised value data 102B.

In step S16, when a topcoat with an easily peelable paint is not recommended, that is, when a topcoat with an easily peelable paint should not be proposed, the process moves to step S19, and the user is asked to confirm whether or not to wish to topcoat with an easily peelable paint. For example, even if there is no plan to sell the vehicle at the time of ordering the vehicle, the user may wish to topcoat with an easily peelable paint.

The contract server 100 may output a user interface screen in step S19 that suggests ordering a vehicle having a body color desired by the user.

If a positive determination is obtained in this step, the process moves to step S17.

By the processing so far, the body color and the coating method thereof are determined.

Note that the user may not wish to topcoat the vehicle with an easily peelable paint. For example, in the screen shown in FIG. 6, the user selects "no topcoat". In such a case, the contract server 100 decides not to topcoat with an easily peelable paint and to order a vehicle according to the vehicle body color desired by the user.

In step S18, options incidental to the vehicle are selected. In this step, for example, the selection of manufacturer options such as safety equipment and dealer options such as in-vehicle terminals are accepted.

When the specifications of the vehicle are determined, specification data is generated and stored according to the determined specifications.

In step S20, the order unit 1012 generates ordering instruction data based on the generated specification data and transmits it to the vehicle base that is the ordering destination of the vehicle.

Figure 8:
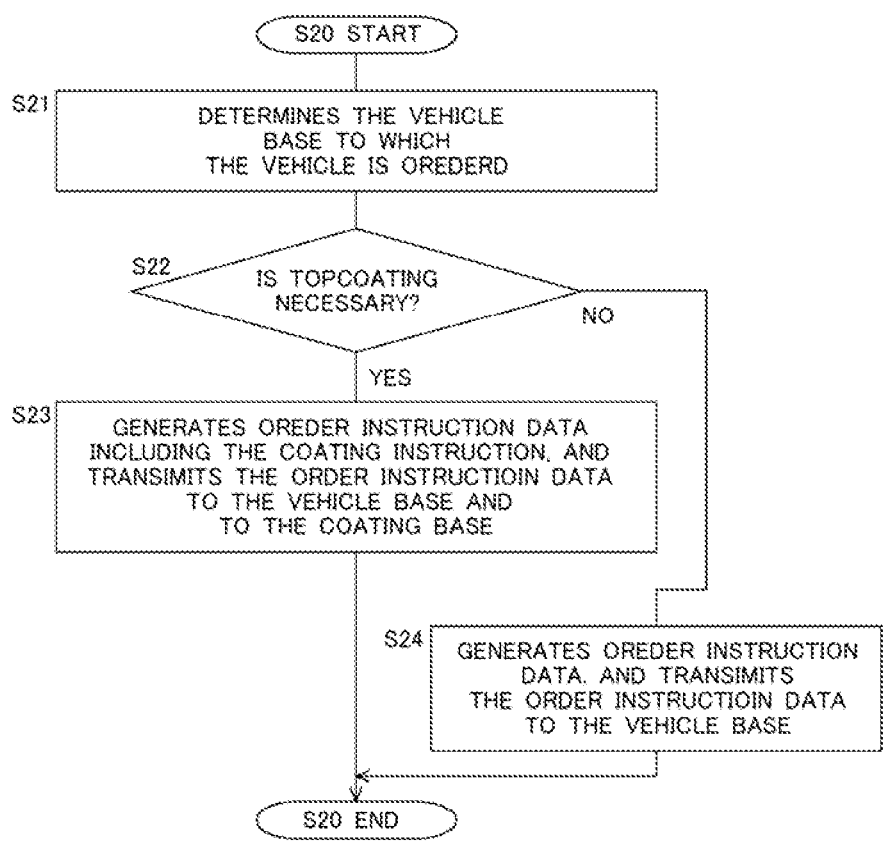
FIG. 8 is a flowchart of a process executed in step S20.

FIG. 8 is a flowchart of a process executed by the order unit 1012 in step S20.

First, in step S21, the order unit 1012 determines the vehicle base to which the vehicle is ordered. In this step, for example, referring to the order-related data 102C, the inventory of the vehicle having the specifications indicated by the specification data is confirmed, and after deciding whether to deliver the stock vehicle or perform new production, the vehicle base to be ordered is determined.

Next, in step S22, the order unit 1012 determines whether or not a topcoating is necessary. A case in which a topcoating is required is, for example, when both the first and second body colors are specified in the specification data.

When only the first vehicle body color is specified for the target vehicle, the ordering unit 1012 generates order instruction data and transmits the order instruction data to the vehicle base for providing the vehicle (step S24).

When both the first body color and the second body color are specified for the target vehicle, the ordering unit 1012 generates order instruction data including the coating instruction, and transmits the order instruction data to the vehicle base for providing the vehicle and to the coating base for performing the topcoating on the vehicle (step S23). The order instruction data includes the specifications of the vehicle (including the first body color and the second body color) and the designation of the coating base where the topcoating is performed.

The coating base for performing the topcoating may be, for example, a dealer, an inspection center, a sheet metal coating center, or the like. The vehicle base and the coating base may be the same.

In step S20, the delivery date of the vehicle may be determined when the vehicle having the determined second body color is topcoated with a topcoat of the determined first body color. For example, the order unit 1012 may determine the delivery date of the requested vehicle based on the order-related data 102C and present it to the user. When the transmission of the order instruction data is completed, the contract server 100 may notify the user that the vehicle order has been completed.

Upon receiving the order instruction data to perform topcoating, the vehicle base prepares (or manufactures) a vehicle having a second body color, and if necessary, coats it in the first body color before delivering it to the user. Painting in the first body color can be performed at the designated coating base. In addition, when the vehicle base where the vehicle is prepared (or manufactured) and the coating base are different, the vehicle may be forwarded.

Upon receiving the order instruction data to do not perform topcoating, the vehicle base prepares (or manufactures) a vehicle having a second body color and delivers it to the user.

As explained above, in the vehicle ordering system of the first embodiment, the contract server 100 determines whether to order the vehicle with the specified color or to topcoat the vehicle having a color other than the specified color with the specified color, based on the value of the vehicle after the specified period of time has elapsed. According to such a configuration, a vehicle having a desired body color can be provided by the user and the value when reselling a used car can be improved.

Since the easily peelable paint has a service life, when the vehicle is painted with the easily peelable paint, it is preferable to provide guidance to the user regarding the service life of the paint. For example, the contract server 100 may transmit information on the service life of the paint to the user terminal 200. The notification may include information about a site that provides a service for peeling off the topcoat coat.

(Modification)

The above embodiment is only an example, and the present disclosure can be appropriately changed and implemented within the range that does not deviate from the gist thereof.

For example, the processes and means described in the present disclosure can be freely combined as long as no technical contradiction occurs.

Further, in the description of the embodiment, a form in which the vehicle is sold to a user has been exemplified, but the information processing apparatus according to the present disclosure can be applied to a form other than sales, such as lending.

Further, in the description of the embodiment, the appraised value of the vehicle was acquired based only on the first body color, but the evaluation appraised value of the vehicle may be acquired based on the combination of the first body color and the second body color. This is because if the service life of the easily peelable paint remains, the vehicle itself with the topcoating may have value.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), and any type of medium suitable for storing electronic instructions, such as read-only memories (ROMs), random access memories (RAMs), EPROMs, EEPROMs, magnetic cards, flash memories, or optical cards.

What is claimed is:

1. An information processing apparatus comprising:
a controller including a processor and a memory that stores a program to be executed by the processor,
wherein the processor is configured to:
receive, from a user terminal, a first body color selected by a user as a body color of a vehicle,
at least based on the appraised value of the vehicle having the first body color after a predetermined period has elapsed, determining whether a predetermined condition is met to propose to the user terminal to topcoat the vehicle having a second body color, with an easily peelable paint having the first body color,
generate a user interface screen on the user terminal that proposes the topcoat with the easily peelable paint based upon the predetermined condition being met,
receive a selection via the user interface screen on the user terminal to include the topcoat with the easily peelable paint, and
generate and transmit an order instruction including the selection of the topcoat with the easily peelable paint to a vehicle base station and cause the vehicle base station to change the body color of the vehicle by performing topcoating of the vehicle with the easily peelable paint.

2. The information processing apparatus according to claim 1, wherein the controller further calculates a cost of topcoating the vehicle with the easily peelable paint and the predetermined condition is at least partly based on the cost.

3. The information processing apparatus according to claim 2, wherein the controller calculates the cost of the topcoating based on the model of the vehicle and the first body color.

4. The information processing apparatus according to claim 2, wherein when the appraised value of the vehicle having the second body color after the predetermined period has elapsed exceeds the value obtained by adding the appraised value of the vehicle having the first body color and the cost, the predetermined condition is met.

5. The information processing apparatus according to claim 1, wherein the controller transmits to the user terminal the appraised value of the vehicle after the predetermined period has elapsed for each of a plurality of second body color candidates.

* * * * *